United States Patent [19]

Cordell

[11] 4,219,788
[45] Aug. 26, 1980

[54] ACTIVE VARIABLE EQUALIZER

[75] Inventor: Robert R. Cordell, Tinton Falls, N.J.

[73] Assignee: Bell Telephone Laboratories, Incorporated, Murray Hill, N.J.

[21] Appl. No.: 954,306

[22] Filed: Oct. 24, 1978

[51] Int. Cl.² .................................................. H03H 7/14
[52] U.S. Cl. .................................. 333/28 R; 307/264; 330/109; 330/126; 330/151; 330/282; 330/284; 330/304
[58] Field of Search ............... 333/28 R; 330/89, 109, 330/126, 145, 151, 282, 284, 304

[56] References Cited
U.S. PATENT DOCUMENTS

| | | | |
|---|---|---|---|
| 3,921,104 | 11/1975 | Gundry | 333/28 R |
| 3,921,105 | 11/1975 | Brglez | 333/28 R |
| 4,004,253 | 1/1977 | Takasaki et al. | 333/28 R |
| 4,055,818 | 10/1977 | Gay | 333/28 T |

*Primary Examiner*—Paul L. Gensler
*Attorney, Agent, or Firm*—Richard B. Havill

[57] ABSTRACT

An active variable equalizer is arranged to provide a Bode type variable equalizer characteristic without requiring an inductor. The equalization shape remains unchanged as the amount of equalization is varied. This equalizer uses a tandem arrangement of additive feedforward and negative feedback to achieve the mentioned equalization shape.

7 Claims, 11 Drawing Figures

ACTIVE VARIABLE EQUALIZER

BACKGROUND OF THE INVENTION

The invention relates to a variable equalizer including an active circuit having a variable transfer characteristic for compensating deviation of a transmission characteristic.

In wire transmission systems using a coaxial cable or a cable pair, the transmission characteristic of the cable varies depending upon the length of the path in the transmission medium and the ambient temperature. A Bode type variable equalizer often is used to compensate for the variation of the transmission characteristic because such an equalizer possesses a unique property in that its equalization shape does not change as the amount of equalization is varied. In mathematical terms, the equalization shape $V(\omega)$ closely approximates an ideal relationship which is expressed as $$V(\omega) = \rho F(\omega) \text{ dB for } -1 < \rho < +1,$$

where $V(\omega)$ and $F(\omega)$ are equalization shapes in decibels and $\rho$ is a control parameter which determines the amount and sign of the equalization.

H. W. Bode has shown that a practical transform function which can be represented by an expression $$\frac{1 + xF(s)}{x + F(s)} \text{ for } 0 < x < \infty$$

produces a response characteristic that is very close to the ideal relationship. In this transform function, x is a control parameter for controlling the sign and magnitude of the equalization. The function $F(s)$ is a transfer function of the frequency characteristic produced for maximum equalization, i.e., when the parameter $x = \infty$.

Bode equalizers generally are passive circuits and typically require inductors. As a result, Bode type variable equalizers are not fabricated in integrated circuit form.

Several active variable equalizers without inductors have been disclosed in the prior art. Some of these prior art active variable equalizers, such as those disclosed by F. Brglez in U.S. Pat. No. 3,921,105, are sensitive to variation of both amplifier gain and passive component values because they rely upon positive feedback and/or signal subtraction to achieve equalization. Other prior art active equalizers, such as those disclosed by Y. Takasaki et al in U.S. Pat. No. 4,004,253, employ overlapping feedforward and feedback loops requiring closely-matched shaping networks and a wide-ranging control function or a pair of closely-matched wide-ranging control functions.

It is an object to provide an active variable equalizer without an inductor.

It is another object to provide an active variable equalizer having a transfer characteristic such that the equalization shape does not change as the amount of equalization is varied.

SUMMARY OF THE INVENTION

These and other objects of the invention are realized by an active variable equalizer circuit including first and second combining circuits, a frequency dependent circuit, and a splitting circuit. The first combining circuit produces an intermediate signal in response to an input signal and a negative feedback signal. The second combining circuit produces an output signal in response to the intermediate signal and to an additive feedforward signal. The frequency dependent circuit produces a frequency dependent signal in response to the intermediate signal. A circuit splits the frequency dependent signal into a fraction that is the additive feedforward signal and the remainder which is the negative feedback signal. The equalizer has a transfer function that is proportioned at any selected frequency within a range to an expression $$\frac{1 + xF(s)}{x + F(s)},$$

wherein x is the ratio of the fraction of the frequency dependent signal to the remainder thereof, $F(s) = H(s) + 1$, and $H(s)$ is independent of x.

It is a feature of the invention to use a tandem arrangement of additive feedforward and negative feedback to achieve a Bode type active variable equalizer.

It is another feature of the invention that an active variable equalizer has a transfer function proportioned at any selected frequency within a range to an expression $$\frac{1 + xF(s)}{x + F(s)},$$

wherein x is the ratio of a fraction of the frequency dependent signal to the remainder thereof, $F(s) = H(s) + 1$ and $H(s)$ is independent of x.

It is another feature that the sum of the magnitude of the feedforward signal and the magnitude of the feedback signal equals the magnitude of the frequency dependent signal for the range of x.

It is a further feature that the additive feedforward signal is equal to the difference between the frequency dependent signal and the negative feedback signal.

It is a still further feature that the negative feedback signal is equal to the difference between the frequency dependent signal and the additive feedforward signal.

It is still another feature to generate a frequency dependent product signal, the negative feedback signal being equal to the difference between the frequency dependent signal and the frequency dependent product signal and the additive feedforward signal is equal to the sum of the frequency dependent signal and the frequency dependent product signal.

BRIEF DESCRIPTION OF THE DRAWINGS

The above objects and features of the invention will be apparent from the following description of embodiments of the invention when that description is considered in conjunction with the accompanying drawings wherein.

DETAILED DESCRIPTION

Figure 1:
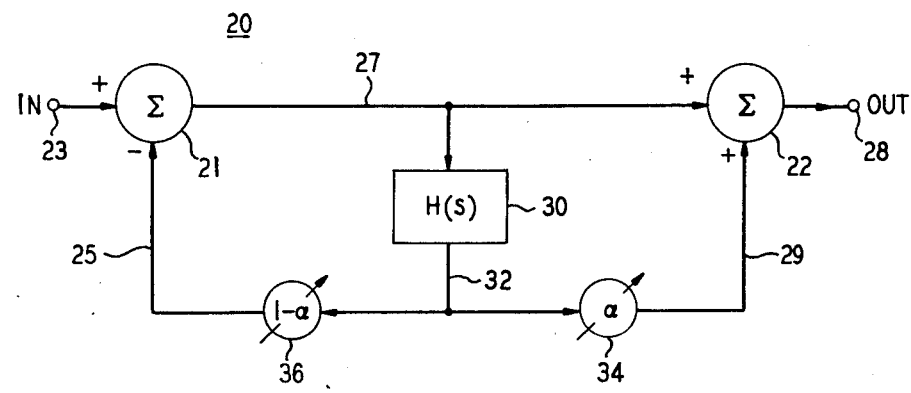
FIG. 1 is a block diagram of an active variable equalizer.

Referring now to FIG. 1, there is shown a topological block diagram of an active variable equalizer circuit 20. A circuit 21 is arranged for receiving and combining signals applied by way of an input terminal 23 and a negative feedback lead 25. The resulting combined signal is produced as an intermediate signal on lead 27. Another circuit 22 is arranged for receiving and combining into an output signal the intermediate signal on lead 27 with a signal on an additive feedforward lead 29. The mentioned output signal is produced at output terminal 28. A frequency dependent circuit 30 has an input interconnecting with the lead 27. In response to the intermediate signal on lead 27, the circuit 30 produces a frequency dependent output signal on lead 32. This frequency dependent signal on lead 32 is split into parts by a pair of variable attenuators 34 and 36.

The variable attenuators 34 and 36 when considered together form a splitter circuit, or signal fork, which divides the frequency dependent signal into an additive feedforward signal on lead 29 and a negative feedback signal on lead 25. The attenuators 34 and 36 vary in a way that the magnitude of the resulting additive feedforward signal and the negative feedback signal vary in a complementary fashion. A fraction $\alpha$ of the frequency dependent signal is fed forward, and the remainder 1-$\alpha$ of the frequency dependent signal is fed back. Therefore the sum of the magnitude of the feedforward signal on lead 29 and the magnitude of the feedback signal on lead 25 equals the magnitude of the frequency dependent signal on lead 32.

The frequency dependent circuit 30 is an arrangement having a frequency dependent transfer function proportional to H(s) from lead 27 to lead 32. That transfer function H(s) is chosen to provide from the input terminal 23 to the output terminal 28 any desired overall equalizer transfer function represented by an expression $$\frac{1 + xF(s)}{x + F(s)},$$

where F(s)=H(s)+1. H(s) is independent of x.

The combining circuits 21 and 22 are arranged to combine input signals applied by way of a plurality of inputs. Examples of such a combining circuit include both a summer and a summing node. The individual inputs of the summers may have a polarity of either a positive or a negative sense. The particular polarity input used in any specific configuration is selected so that the polarities of the feedforward signal and the intermediate signal are combined constructively in the combining circuit 22 and so that the polarities of the feedback signal and the input signal are combined so as to provide negative feedback.

Figure 2:
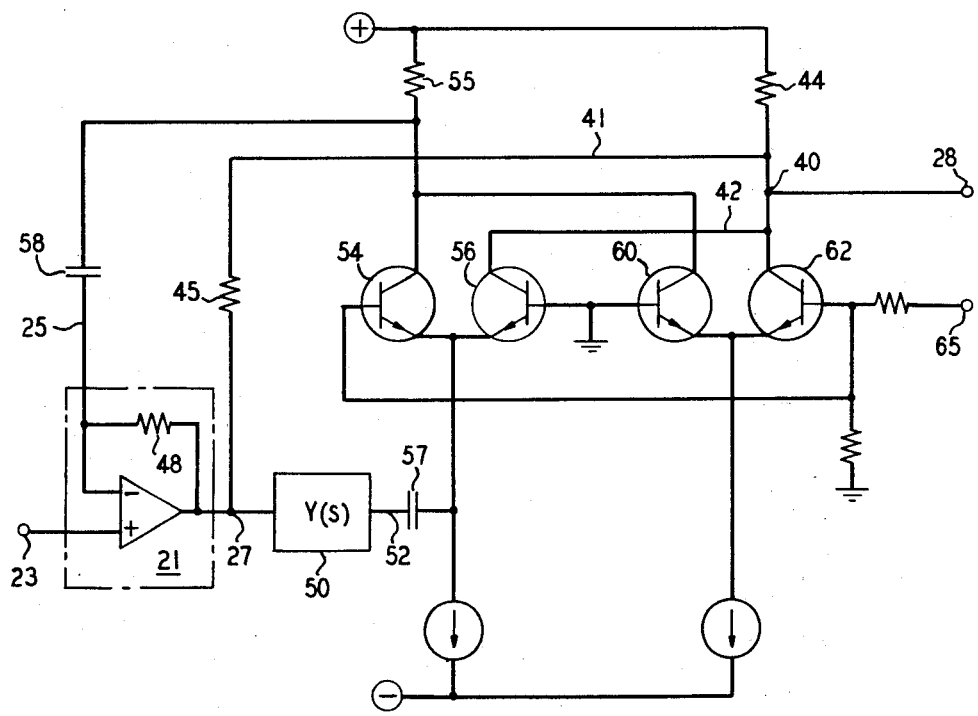
FIG. 2 is a combination block diagram and schematic of an active variable equalizer.

Referring now to FIG. 2, there is shown an active variable equalizer circuit arranged like the block diagram of FIG. 1. The combining circuit 21 is represented by an operational amplifier summer having the input terminal 23 connected with the non-inverting input of the amplifier for receiving the input signal. The negative feedback signal is applied to the inverting input of the operational amplifier. The intermediate signal voltage resulting from combining the input signal with the negative feedback signal is produced on lead 27. Another combining circuit is provided by a node 40 which is arranged to sum signal currents from leads 41 and 42, representing respectively the intermediate signal and the additive feedforward signal. The resulting output signal current is conducted through a load resistor 44 and produces an output signal voltage at output terminal 28.

Summing of current signals at node 40 is an example of a way to combine signals, as mentioned in the discussion of the operation of circuit 22 in FIG. 1. Other well known arrangements also can perform suitable combining functions.

Referring once again to FIG. 2, the intermediate signal voltage on lead 27 is converted to a current signal by a resistor 45.

A frequency dependent admittance network 50 is an arrangement having a frequency dependent voltage-to-current transfer function Y(s) from lead 27 to lead 52. That transfer function Y(s) is chosen to provide from the input terminal 23 to the output terminal 28 any desired overall equalizer transfer function represented by the expression described with respect to FIG. 1.

Referring again to FIG. 2, an emitter-coupled pair of transistors having a common source of emitter current is arranged to split the frequency dependent signal on lead 52. A fraction of the frequency dependent signal current is directed through the collector circuit of the transistor 56 for combining with the intermediate signal at node 40. The remainder of the frequency dependent signal current is directed through the collector circuit of the transistor 54 and the lead 25 to the inverting input of the combining circuit 21.

Because of a known virtual short characteristic at the inverting input of the operational amplifier in combining circuit 21, a resistor 48 in the combining circuit 21 converts the current signal on lead 25 to a voltage. Thus, in the transfer function representing the arrangement of FIG. 2, H(s)=Y(s)·R, where R is the resistance of resistor 48. A resistor 55 in the collector circuit of transistor 54 supplies d.c. operating current to the collector circuit of transistor 54. Proper operation of the circuit is achieved by selecting resistors 44, 45, 48 and 55 for equal resistance.

Because all of the frequency dependent signal current in lead 52 is conducted into the transistors 54 and 56, the sum of the signal currents in their collector circuits must be equal substantially to the frequency dependent signal current, independent of any particular splitting ratio. The fact that the sum of the signal currents fed back and fed forward always bears the same relationship to the frequency dependent signal current, regardless of the splitting ratio, is important in achieving proper active variable equalizer operation.

Variation with the splitting ratio of the parallel combination of the emitter input impedances of transistors 54 and 56 is very small compared to the impedance of the admittance network 50 so that the frequency dependent voltage-to-current transfer function is substantially independent of the splitting ratio. This also is advantageous for achieving proper operation of the active variable equalizer.

Control of the splitting action of transistors 54 and 56 is achieved by coupling a control signal through a terminal 65 to the base of the transistor 54. This control signal is arranged to cause transistor 54 to conduct more or less d.c. current than transistor 56 conducts. The signal splitting action depends on the fact that the frequency dependent current applied to the emitters of the transistors 54 and 56 splits in the same way that the d.c. emitter current splits in response to the control signal.

Capacitors 57 and 58 are interposed in their respective paths for blocking direct current.

Another pair of emitter-coupled transistors 60 and 62 is interconnected with the collector circuits of transistors 54 and 56. Transistors 60 and 62 are controlled by the control signal applied at the terminal 65 in the same manner as transistors 54 and 56 and are arranged to generate direct currents that are complements of the direct currents of the other pair. These complementary direct currents cancel out control signal feedthrough which would occur as a result of controlling with a single emitter-coupled pair of transistors.

Figure 3:
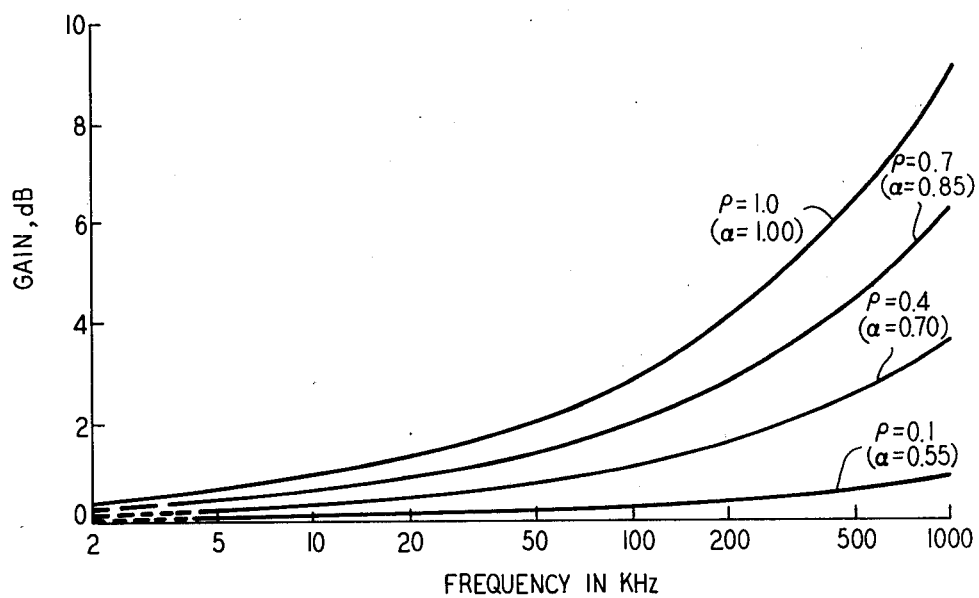
FIG. 3 is a diagram of a variable equalizer response characteristic.

Referring now to FIG. 3, there is shown a family of variable equalizer frequency response characteristics typical of the response characteristics which can be realized by the arrangements of FIGS. 1 and 2. These response characteristics represent different amounts of "square-root of F" equalization, wherein equalization in decibels is proportional to the square root of frequency. Equalizers having such characteristics are used for providing equalization in wire transmission systems. These response characteristics are best achieved using Bode type variable equalizers, wherein the equalization shape remains unchanged, as the amount of equalization is varied.

The frequency response characteristics shown are for several representative values of an equalization control parameter $\rho$. Although not specifically shown in FIG. 3, it is to be understood that additional curves, which are symmetrical with those shown, are applicable directly to negative values of the parameter $\rho$. Corresponding values of another equalization control parameter, i.e., the previously mentioned fraction $\alpha$, are shown in parentheses under their counterpart values of the parameter $\rho$. The value of the fraction $\alpha$ is related to the value of the parameter $\rho$ by the expression $$\alpha = \frac{\rho + 1}{2}.$$

The response characteristics of FIG. 3 are realized by the active variable equalizers shown in FIGS. 1 and 2 by properly choosing the transfer functions H(s) and Y(s). Although the response characteristics shown are of particular interest with respect to wire transmission systems, many other response characteristics are obtained by choosing a different H(s) or Y(s).

Selection of the proper response characteristics for H(s) and Y(s) is simple because at $\rho=1$, for maximum equalization, F(s) equal H(s)+1. Thus, given any desired F(s), a designer selects H(s) equal to F(s)−1.

For example, given the response characteristics of FIG. 3, the designer selects the admittance network 50 in FIG. 2 to provide an admittance which increases with frequency. One such network is a parallel combination of a plurality of series R-C branches. The resulting equalizer provides Bode type variable equalization, wherein the equalization shape remains unchanged as the amount of equalization is varied.

Figure 4:
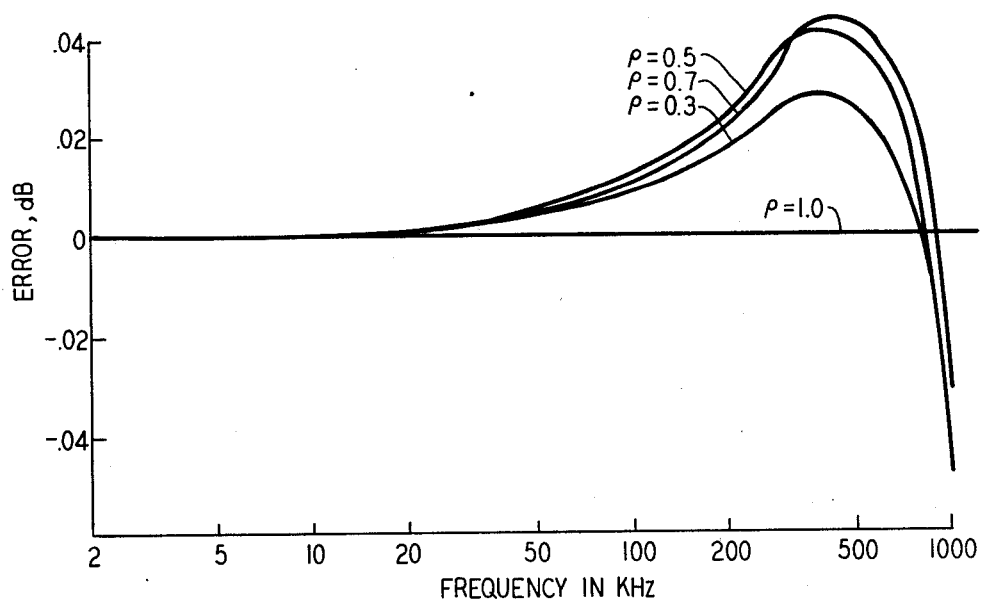
FIG. 4 is a diagram of error resulting from a variable equalizer characteristic.

Referring now to FIG. 4, there is shown a family of variable equalizer error characteristics for an equalizer having the response characteristics shown in FIG. 3. It is to be understood that the variable equalizer is a circuit having a frequency response characteristic that is a close approximation of the ideal response characteristic which is represented by the expression $$V(\omega) = \rho F(\omega) \text{ dB for } -1 < \rho < +1.$$

The error curves shown in FIG. 4 depict the departure of the variable equalizer response characteristics from the ideal response characteristics. Error curves corresponding to several representative values of the parameter $\rho$ are shown. It is noted that a symmetrical set of error curves exists for negative values of the parameter $\rho$ but is not shown in FIG. 4. Resulting error is minimized when the parameter $\rho$ equals −1.0, zero and +1.0. Maximum error, which is less than 0.05 dB, is quite small. Equalizers of types other than the Bode type do not provide adjustable equalization with such small error.

The following describes how the arrangement disclosed herein provides a response characteristic corresponding to the response characteristic of the variable equalizer disclosed by Bode. The Bode type variable equalizer characteristic is known to be satisfied by any equalizer circuit having a transfer function V(s) represented by the expression $$V(s) = \frac{1 + xF(s)}{x + F(s)} \text{ for } 0 < x < \infty,$$

where F(s) is a transfer function representing maximum equalization and x is a control parameter having a range from zero to infinity. The parameter x determines both the magnitude and the sign of equalization. Thus for example
 when x=0, V(s)=1/F(s);
 when x=1, V(s)=1;
 when x=∞, V(s)=F(s).

Disclosures relating to passive variable equalizers have defined the control parameter $\rho$ in terms of the parameter x. That definition is represented by the expressions $$\rho = \frac{x - 1}{x + 1}$$

$$\text{and } x = \frac{1 + \rho}{1 - \rho} \text{ for } -1 < \rho < +1.$$

It is noted that the control parameter $\rho$ has a range from −1 to +1 rather than the range of zero to infinity used for parameter x.

By inserting the expression for parameter x in terms of the control parameter $\rho$ into the expression for the transfer function V(s), that transfer function can be represented by the expression $$V(s) = \frac{[1 + F(s)] - \rho[1 - F(s)]}{[1 + F(s)] + \rho[1 - F(s)]} \text{ for } -1 < \rho < +1.$$

A key to understanding my contribution results from following some additional manipulation of the transfer function. This further manipulation commences with a further redefinition of the equalization control parameter and the restriction of its range to a range of zero to unity. The new parameter is the fraction $\alpha$ which has been mentioned previously. The fraction $\alpha$ satisfies the expressions $$\alpha = \frac{\rho + 1}{2}$$

$$\rho = 2\alpha - 1 \text{ for } 0 < \alpha < 1.$$

By substituting for $\rho$ in terms of $\alpha$ in the expression for the transfer function V(s), that transfer function can be represented by the expression $$V(s) = \frac{1 + \alpha[F(s) - 1]}{\alpha + [1 - \alpha]F(s)} \text{ for } 0 < \alpha < 1.$$

This expression for the transfer function V(s) in terms of $\alpha$ can be rearranged into $$V(s) = \frac{1 + \alpha[F(s) - 1]}{1 + (1 - \alpha)[F(s) - 1]}$$

and $V(s) = \frac{1 + \alpha H(s)}{1 + (1 - \alpha)H(s)}$, where $H(s) = F(s) - 1$.

The circuits of FIGS. 1 and 2 provide such a transfer function because of the additive feedforward arrangement and the negative feedback arrangement. The numerator of the transfer function V(s) is accomplished by the additive feedforward arrangement provided in those circuits. Therein the magnitude of the signal, shaped by the circuits 30 and 50 and fed forward, is controlled by the fraction, or parameter $\alpha$. Similarly the denominator of the transfer function V(s) is accomplished by the negative feedback arrangements provided in FIGS. 1 and 2. The magnitude of the signal, shaped by the circuits 30 and 50 are fed back is controlled by a complement of parameter $\alpha$, i.e., the remainder $1 - \alpha$ which was mentioned previously.

Although the embodiments of FIGS. 1 and 2 describe specific feedforward and feedback arrangements, it is noted that the transfer function V(s) in terms of $\alpha$ shows that in general active variable equalizers of the Bode type can be made by tandem arrangements of feedback and feedforward circuits.

Control functions represented by the fraction $\alpha$ and the remainder $1 - \alpha$ can be realized as separate variable attenuators, however, an advantage of the present invention is that a single control element can provide both of those control functions. A simple differencing arrangement provides the complementing desired.

Further advantages include the fact that the control parameter need only vary over a moderate range (e.g., zero to unity) to achieve the full range of which the equalizer is capable and the fact that the amount of equalization in decibels at any given frequency is a linear function of the control parameter.

Figure 5:
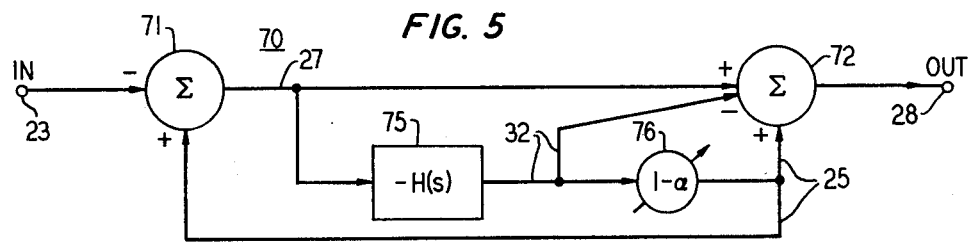
FIG. 5 is a block diagram of a variable equalizer.

Referring now to FIG. 5, there is shown a topological block diagram of another active variable equalizer 70 which is similar in many respects to the circuit 20 of FIG. 1. In FIG. 5, however, the feedforward signal is realized by taking the difference between the magnitudes of the frequency dependent signal on lead 32 and the feedback signal on lead 25. Except for polarities shown, a combining circuit 71 is similar to the combining circuit 21 in FIG. 1. The intermediate signal on lead 27 is applied to an input of a circuit 72 and to an input of a frequency dependent circuit 75. Circuit 75 differs from the circuit 30 of FIG. 1 because of the polarity of the transfer function represented thereby, however, it responds to the intermediate signal on lead 27 and produces a frequency dependent signal on lead 32. A portion of the signal on lead 32, determined by a variable attenuator 76, is fed back by way of the lead 25 to the combining circuit 71. Polarities are selected so that negative feedback results.

The circuit 72 is arranged for receiving and combining the intermediate signal on lead 27, the whole frequency dependent signal on lead 32 and the feedback signal on lead 25. The magnitude of the feedforward signal for proper operation is the fraction $\alpha$ which is formed by the difference between the magnitude of the signal on lead 32 and the signal on lead 25. Circuit polarities are selected so that additive feedforward results.

The embodiment of FIG. 5 has a Bode type transfer function because the requisite additive feedforward and negative feedback are provided.

Figure 6:
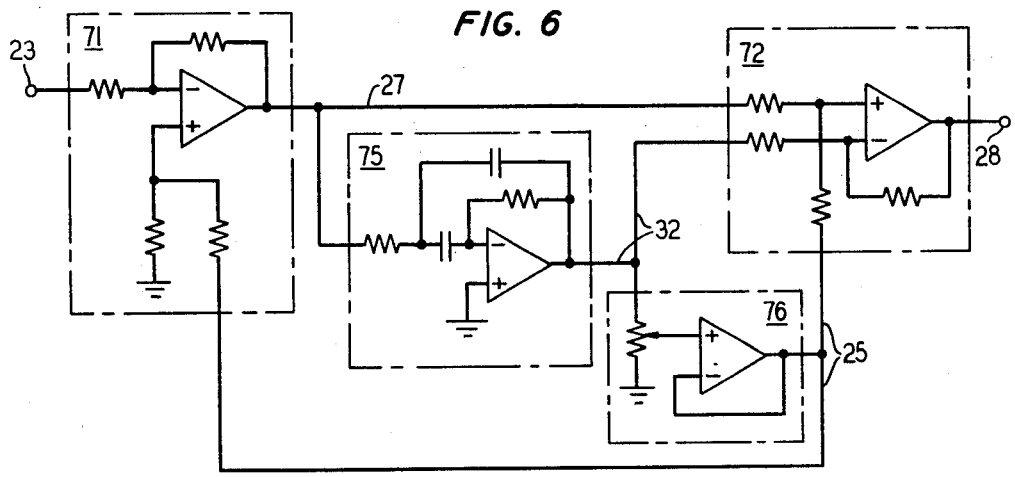
FIG. 6 is a schematic diagram of the variable equalizer of FIG. 5.

Referring now to FIG. 6, there is shown a circuit having the topology shown in FIG. 5. The combining circuits 71 and 72 are known operational amplifier circuits. Frequency dependent circuit 75 is a known second order bandpass filter. Variable attenuator 76 is a potentiometer with an output buffered by a voltage-follower circuit. This buffering permits the amount of attenuation and resulting equalization to be a linear function of the potentiometer setting if a linear taper is employed in the potentiometer.

It is noted that the circuit of FIG. 6 like the circuit of FIG. 5 provides a Bode type transfer characteristic.

Figure 7:
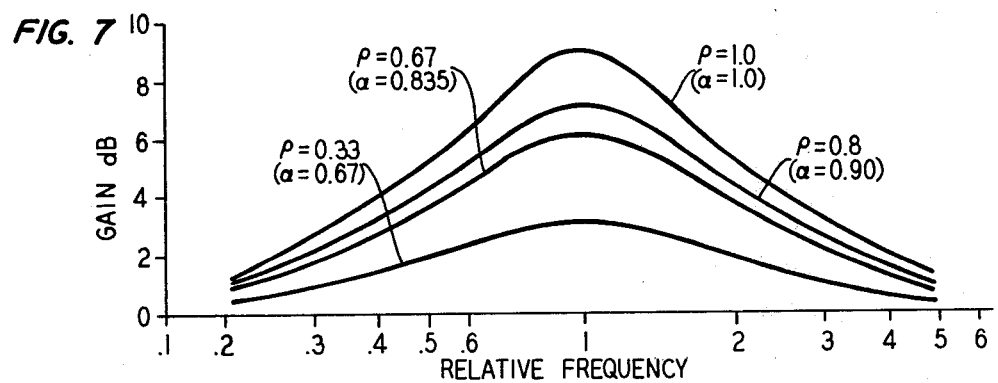
FIG. 7 is a diagram of the response characteristic of the variable equalizer of FIG. 6.

Referring now to FIG. 7, there is shown a family of frequency response characteristics for the variable equalizer of FIG. 6. The curves represent the response characteristics resulting from different values of the control parameter, i.e., different settings of the potentiometer. Only curves representing positive values of the control parameter $\rho$ are shown, however, it is to be understood that other settings of the potentiometer corresponding to negative values of the parameter $\rho$ will result in a symmetrical set of response characteristics.

Figure 8:
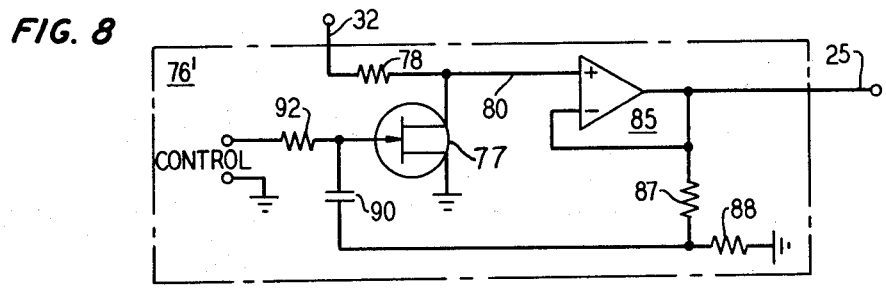
FIG. 8 is an alternative arrangement for producing the feedback signal in the equalizer of FIG. 6.

Referring now to FIG. 8, there is shown an alternative variable attenuator 76' for the variable attenuator 76 of FIGS. 5 and 6. The variable attenuator 76' in FIG. 8 enables control by a dc voltage. Attenuator 76' uses the known voltage-controlled resistance characteristic of a field-effect transistor 77. The frequency dependent signal applied by way of lead 32 is attenuated by a resistor 78 and the drain-to-source resistance of the field-effect transistor 77. The attenuated signal appears on lead 80 and is buffered by an operational amplifier voltage-follower circuit 85. Feedback signal for the circuit of FIG. 6 is produced on the lead 25 in FIG. 8.

A share of the signal on lead 25 is fed back within the variable attenuator 76' to the gate of transistor 77 by way of a voltage divider including resistors 87 and 88 and a coupling capacitor 90. This feedback arrangement reduces distortion effects in the transistor 77.

Attenuation provided by the attenuator 76' is controlled by the magnitude of a dc control voltage that is applied through a resistor 92 to the gate of transistor 77.

Figure 9:
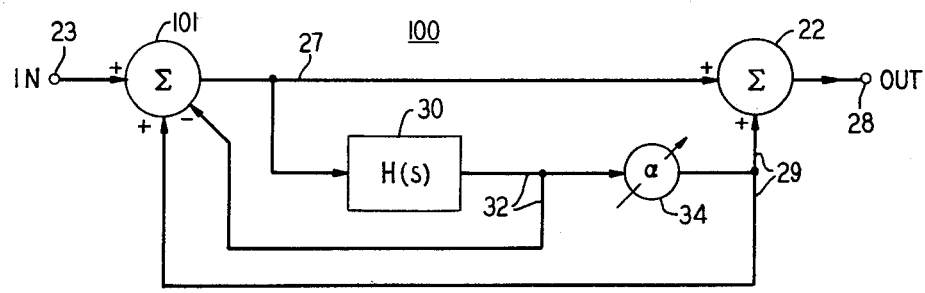
FIGS. 9 and 10 are block diagrams of other variable equalizers.

Referring now to FIG. 9, there is shown a topological block diagram of an active variable equalizer 100 wherein the feedback signal is realized as a difference between the magnitude of the frequency dependent signal on lead 32 and the magnitude of the feedforward signal on lead 29. A circuit 101 is arranged for receiving and combining signals applied by way of the input terminal 23, the lead 32 and the lead 29. The feedback signal required for proper operation is formed in the circuit 101 as the difference between the magnitudes of the signals on leads 32 and 29. Circuit polarities for the feedback arrangement are selected so that negative feedback results. The resulting combined signal from the circuit 101 is produced as the intermediate signal on lead 27. The frequency dependent circuit 30 produces the frequency dependent signal on lead 32 in response to the intermediate signal.

The variable attenuator 34 and the feedforward through lead 29 to circuit 22 are similar to the previously described arrangement of FIG. 1. Output signals of course are generated at terminal 28.

Because of the advantageous feedforward and feedback arrangements the circuit of FIG. 9 has a Bode type variable equalizer characteristic.

Figure 10:
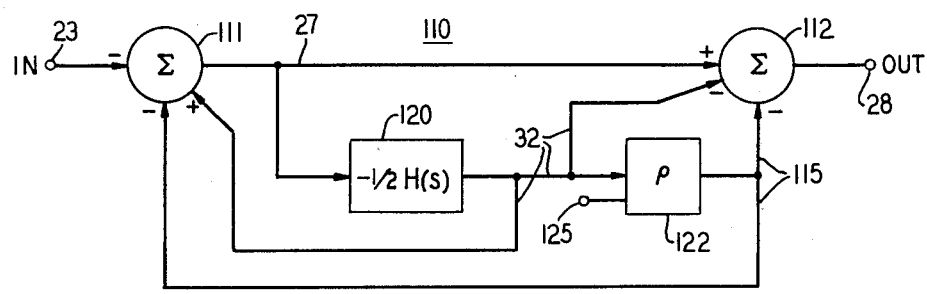

Referring now to FIG. 10, there is shown an active variable equalizer 110 wherein the feedback signal is a combination of the frequency dependent signal and a frequency dependent product signal and wherein the feedforward signal is a different combination of the frequency dependent signal and the frequency dependent product signal. A circuit 111 is arranged for receiving and combining signals applied by way of the input terminal 23, the lead 32, and a lead 115. The feedback signal applied for proper operation of the equalizer 110 is a combination of the signals on leads 32 and 115. Determination of the combination to be used is discussed further hereinafter, however, it is important that circuit polarities be chosen so that negative feedback results.

The resulting combined signal from circuit 111 is produced as an intermediate signal on lead 27. A frequency dependent circuit 120, responsive to the intermediate signal on lead 27, produces a frequency dependent signal on lead 32. Frequency dependent circuit 120 has a voltage transfer function $\frac{1}{2} H(s)$.

A four quadrant analog multiplier circuit 122 is arranged for receiving the frequency dependent signal and multiplying it by the control parameter $\rho$. The scalar value of the control parameter $\rho$ is determined by a control signal applied to terminal 125. Output of the multiplier circuit 122 is a frequency dependent product signal that is produced on lead 115.

Another circuit 112 is arranged for receiving and combining the intermediate signal on lead 27, the frequency dependent signal on lead 32 and the frequency dependent product signal on lead 115. A feedforward signal required for proper operation is formed in the combining circuit 112 as a combination of the signals on leads 32 and 115. Circuit polarities are selected so that additive feedforward results.

Suitable combinations of the frequency dependent signal and the frequency dependent product signal for the feedback and feedforward signals include those combinations wherein the resulting feedback and feedforward signals vary as complements of each other. It is noted that these signals are complementary by reference to the following expressions $$FF = V + \rho v$$

$$FB = v - \rho v$$

wherein the feedforward signal FF is represented by the signal v plus a product $\rho$ times v and wherein the feedback signal FB is represented by the difference between the signal v and the $\rho$ times v. Thus when $$\begin{array}{lll} \rho = +1 & FF = 2v & \text{and } FB = 0 \\ \rho = 0 & FF = FB = 0 & \\ \rho = -1 & FF = 0 & \text{and } FB = -2v \end{array}$$

showing the complementary relationship. The 2v magnitude of the resulting maximum signal is offset by the coefficient one-half which is included in the transfer characteristic $\frac{1}{2} H(s)$ in FIGS. 10 and 11.

Circuit gains are selected so that the feedback signal equals zero at one extreme value of the control parameter $\rho$. An additional restriction on the gains is that the feedforward signal equals zero at the opposite extreme value of the control parameter $\rho$. The multiplier circuit 122 provides maximum positive multiplication when the signals on leads 32 and 115 cancel each other in one of the two combining circuits 111 and 112 and add in equal amounts in the other. For maximum negative multiplication the converse holds.

Figure 11:
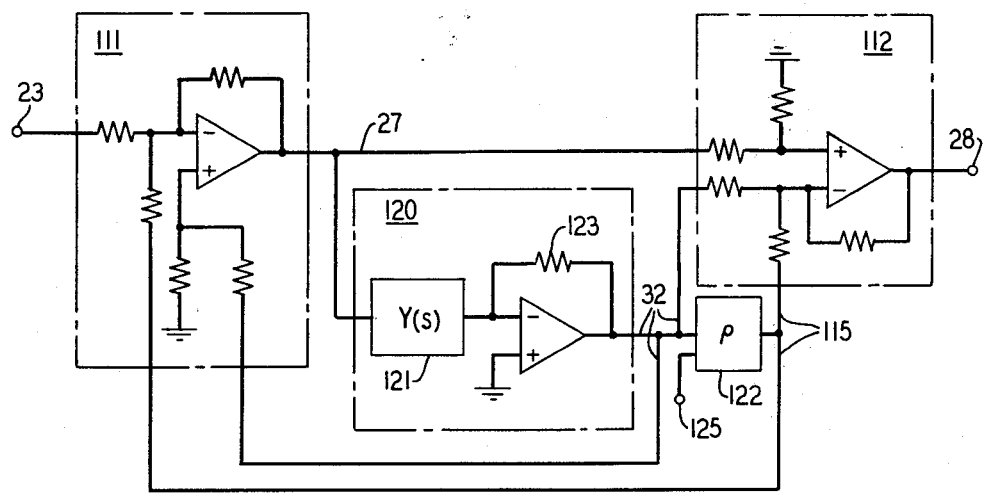
FIG. 11 is a schematic diagram of the equalizer of FIG. 10.

Referring now to FIG. 11, there is shown a schematic of the equalizer of FIG. 10. In FIG. 11 the combining circuits 111 and 112 are represented as known operational amplifier summing circuits. The frequency dependent circuit 120 is presented as a known frequency dependent operational amplifier circuit. The transfer function $\frac{1}{2} H(s)$ of circuit 120 is equal substantially to a product of an admittance Y(s) of a circuit 121 and a resistance R of resistor 123.

The foregoing description presents in detail the arrangement and operation of several embodiments of the invention. These embodiments together with other embodiments obvious to those skilled in the art are considered to be included within the scope of the invention.

What is claimed is:

1. An active variable equalizer circuit comprising
   first and second combining circuits,
   the first combining circuit being responsive to an input signal and a negative feedback signal for producing an intermediate signal,
   the second combining circuit being responsive to the intermediate signal and to an additive feedforward signal for producing an output signal,
   a frequency dependent circuit responsive to the intermediate signal and having a transfer function proportional to H(s) for producing a frequency dependent signal,
   means responsive to the frequency dependent signal for splitting the frequency dependent signal into the additive feedforward signal and applying it to the second combining circuit, the additive feedforward signal including a fraction of the frequency dependent signal, and into the negative feedback signal and applying it to the first combining circuit, the negative feedback signal including the remainder of the frequency dependent signal, and
   the equalizer circuit transfer function is proportioned at any selected frequency within a range to an expression $$\frac{1 + xF(s)}{x + F(s)},$$

wherein x is the ratio of the fraction of the frequency dependent signal to the remainder of that signal, $F(s)=H(s)+1$ and $H(s)$ is independent of x.

2. An active variable equalizer circuit in accordance with claim 1 wherein
the sum of the magnitude of the feedforward signal and the magnitude of the feedback signal equals the magnitude of the frequency dependent signal for the range of x.

3. A circuit for realizing a circuit transfer function between an input terminal and an output terminal, including a first summer having an output connected to a first input of a second summer, means connecting an input of the first summer to the input terminal, means connecting an output of the second summer to the output terminal, means for splitting a signal between first and second terminals, a voltage transfer ratio stage having a transfer function proportional to H(s) connected between the output of the first summer and an input to the signal splitting means, the first terminal being connected to a second input of the first summer for providing a negative feedback signal thereto and the second terminal being connected to a second input of the second summer for providing an additive feedforward signal thereto, the circuit being arranged so that the circuit transfer function is $$\frac{1 + xF(s)}{x + F(s)}$$

wherein x is the ratio of magnitude of the feedforward signal to the magnitude of the feedback signal, $F(s)=H(s)+1$ and $H(s)$ is independent of x.

4. An active variable equalizer circuit comprising first and second combining circuits,
the first combining circuit being responsive to an input signal and negative feedback signal for producing an intermediate signal,
a frequency dependent circuit responsive to the intermediate signal and having a transfer function proportional to H(s) for producing a frequency dependent signal,
the second combining circuit being responsive to the intermediate signal and to an additive feedforward signal,
means responsive to the frequency dependent signal for determining a portion of the frequency dependent signal as the negative feedback signal and applying it to the first combining circuit, the additive feedforward signal being equal to the difference between the frequency dependent signal and the negative feedback signal, and
the equalizer circuit transfer function being proportioned at any selected frequency within a range to an expression $$\frac{1 + xF(s)}{x + F(s)},$$

wherein x is the ratio of the magnitude of the additive feedforward signal to the magnitude of the negative feedback signal, $F(s)=H(s)+1$ and $H(s)$ is independent of x.

5. An active variable equalizer circuit comprising first and second combining circuits,
the first combining circuit being responsive to an input signal and a negative feedback signal for producing an intermediate signal,
a frequency dependent circuit responsive to the intermediate signal and having a transfer function proportional to H(s) for producing a frequency dependent signal,
the second combining circuit being responsive to the intermediate signal and to an additive feedforward signal,
means responsive to the frequency dependent signal for determining a fraction of the frequency dependent signal as the additive feedforward signal and applying it to the second combining circuit, the negative feedback signal being equal to the difference between the frequency dependent signal and the additive feedforward signal, and
the equalizer circuit transfer function being proportioned at any selected frequency within a range to an expression $$\frac{1 + xF(s)}{x + F(s)},$$

wherein x is the ratio of the magnitude of the additive feedforward signal to the magnitude of the negative feedback signal, $F(s)=H(s)+1$ and $H(s)$ is independent of x.

6. An active variable equalizer circuit comprising first and second combining circuits,
the first combining circuit being responsive to an input signal and a negative feedback signal for producing an intermediate signal,
a frequency dependent circuit responsive to the intermediate signal and having a transfer function proportional to $\frac{1}{2}$ H(s) for producing a frequency dependent signal,
the second combining circuit being responsive to the intermediate signal and to an additive feedforward signal,
means responsive to the frequency dependent signal for multiplying the frequency dependent signal by a scalar $\rho$ to generate a frequency dependent product signal,
the negative feedback signal being equal to the difference between the frequency dependent signal and the frequency dependent product signal,
the additive feedforward signal being equal to the sum of the frequency dependent signal and the frequency dependent product signal, and
the equalizer circuit transfer function being proportional at any selected frequency within a range to an expression $$\frac{1 + xF(s)}{x + F(s)},$$

wherein x is the ratio of the magnitude of the additive feedforward signal to the magnitude of the feedback signal, $F(s)=H(s)+1$, $H(s)$ is independent of x, and $-1<\rho<+1$.

7. An active variable equalizer having an input terminal, an output terminal and a transfer function between the input and output terminals, the equalizer comprising
an additive feedforward circuit having a controlled gain in a frequency dependent feedforward path,
a negative feedback circuit having a controlled gain in a frequency dependent feedback path,
means included within the feedforward and feedback paths for controlling the gains of the feedforward and feedback paths, means for connecting the feedforward circuit in a tandem arrangement with the feedback circuit between the input and output terminals, a common frequency dependent circuit having a transfer function proportional to H(s) included within both the feedforward and feedback paths, the gains of the feedforward and feedback paths are varied in response to different settings of the control means in a complementary fashion so that when the gain in the feedforward path is proportional to a fraction less than unity, the gain in the feedback path is proportional to the remainder of unity less the fraction, and the equalizer transfer function is proportional to an expression $$\frac{1 + xF(s)}{x + F(s)},$$

wherein x is a ratio of the fraction to the remainder, $F(s) = H(s) + 1$, and $H(s)$ is independent of x.

* * * * *